(12) United States Patent
Clark, II et al.

(10) Patent No.: US 7,714,892 B2
(45) Date of Patent: May 11, 2010

(54) SYSTEMS, DEVICES AND METHODS FOR DIGITAL CAMERA IMAGE STABILIZATION

(75) Inventors: Airell Richard Clark, II, Albany, OR (US); Richard Wesley Garvin, Corvalis, OR (US); Donald Montgomery Reid, Corvalis, OR (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 642 days.

(21) Appl. No.: 11/594,284

(22) Filed: Nov. 8, 2006

(65) Prior Publication Data

US 2008/0106608 A1   May 8, 2008

(51) Int. Cl.
*H04N 5/228* (2006.01)
*H04N 5/235* (2006.01)

(52) U.S. Cl. ............... 348/208.99; 348/208.4; 348/208.6; 348/208.12; 348/229.1

(58) Field of Classification Search ............ 348/208.99, 348/208.4, 208.6, 208.12, 229.1
See application file for complete search history.

(56) References Cited

U.S. PATENT DOCUMENTS

| | | | |
|---|---|---|---|
| 5,309,243 A * | 5/1994 | Tsai | 348/221.1 |
| 5,550,935 A | 8/1996 | Erdem et al. | |
| 5,657,402 A | 8/1997 | Bender et al. | |
| 5,696,848 A | 12/1997 | Patti et al. | |
| 5,767,987 A | 6/1998 | Wolff et al. | |
| 5,828,793 A * | 10/1998 | Mann | 382/284 |
| 5,920,657 A | 7/1999 | Bender et al. | |
| 6,075,905 A | 6/2000 | Herman et al. | |
| 6,173,087 B1 | 1/2001 | Kumar et al. | |
| 6,204,881 B1 * | 3/2001 | Ikeda et al. | 348/362 |
| 6,208,765 B1 | 3/2001 | Bergen | |
| 6,285,804 B1 | 9/2001 | Crinon et al. | |
| 6,320,979 B1 | 11/2001 | Melen | |
| 6,535,650 B1 | 3/2003 | Poulo et al. | |
| 6,650,704 B1 | 11/2003 | Carlson et al. | |
| 6,804,419 B1 | 10/2004 | Miyake | |
| 6,940,555 B2 | 9/2005 | Okisu et al. | |

(Continued)

OTHER PUBLICATIONS

"Removing Camera Shake from a Single Photograph" by Fergus et al., ACM Transactions on Graphics, vol. 25, Issue 3, Jul. 2006.

(Continued)

*Primary Examiner*—James M Hannett

(57) ABSTRACT

Disclosed are various systems, devices and methods for digital camera image stabilization. In one embodiment, a digital camera captures a plurality of digital images of a subject simultaneously or near-simultaneously and stores the captured images in memory as individual digital data sets. While the digital images are being captured simultaneously or near-simultaneously by means of a plurality of rolling shutters, a relative position determination device such as an angular rate sensor is employed to sense and save to memory data representative of the relative positions of the digital camera at the moments the individual digital images or frames are being exposed. Spatial shift directions and magnitudes are calculated in a processor of the camera on the basis of such data, and then applied to the individual data sets to form aligned data sets comprising aligned data points. To compensate for camera shake occurring while the individual images were being captured, the aligned data sets are added together to form an output data set representative of an output image.

23 Claims, 13 Drawing Sheets

U.S. PATENT DOCUMENTS

| | | |
|---|---|---|
| 6,975,352 B2 | 12/2005 | Seeger et al. |
| 7,046,401 B2 | 5/2006 | Dufaux et al. |
| 7,084,910 B2 | 8/2006 | Amerson et al. |
| 7,098,946 B1 * | 8/2006 | Koseki et al. ............ 348/229.1 |
| 7,116,359 B2 | 10/2006 | Kitamura et al. |
| 7,495,699 B2 * | 2/2009 | Nayar et al. ................ 348/239 |
| 2001/0013895 A1 | 8/2001 | Aizawa et al. |
| 2003/0117412 A1 | 6/2003 | Brooksby et al. |
| 2004/0207734 A1 * | 10/2004 | Horiuchi .................. 348/229.1 |
| 2006/0114331 A1 * | 6/2006 | Tamamura ............. 348/208.13 |
| 2006/0133688 A1 * | 6/2006 | Kang et al. ................. 382/254 |

OTHER PUBLICATIONS

Data Sheet for Analog Devices™ ADXRS300 Angular Rate Sensor.

"An Overview of MEMS Inertial Sensing Technology—Sensors" by Jonathan Berstein, Corning-IntelliSense Corp., http://www.sensormag.com/articles/0203/14/.

"Silicon VSG Rate Gyroscope 'CRS-03'," http://www.ssp.co.jp./sssj/silicon-e.html.

"Good Vibrations from Epson's New Gyro-Sensor" by John Boyd, Technology Newsline 12, Feb. 2005.

\* cited by examiner

Image 1

Image 2

Image 3

Image 4

Output Image

Time Increment = 9

Row #
| 0 | integrate |
| 1 | reset |
| 2 | sample to 2 |
| 3 | integrate |
| 4 | integrate |
| 5 | reset |
| 6 | sample to 1 |
| 7 | integrate |
| 8 | integrate |
| 9 | reset |

Sample 1 → output frame 1A, line 6
Sample 2 → output frame 1B, line 2
Sample 3 →
Sample 4 →

FIG. 5E

Time Increment = 15

| Row # | | |
|---|---|---|
| 0 | | sample to 4 |
| 1 | | integrate |
| 2 | | integrate |
| 3 | | reset |
| 4 | | sample to 3 |
| 5 | | integrate |
| 6 | | integrate |
| 7 | | reset |
| 8 | | sample to 2 |
| 9 | | integrate |
| 10 | | integrate |
| 11 | | reset |
| 12 | | sample to 1 |
| 13 | | integrate |
| 14 | | integrate |
| 15 | | reset |

| | |
|---|---|
| Sample 1 | → output frame 1A, line 12 |
| Sample 2 | → output frame 1B, line 8 |
| Sample 3 | → output frame 1C, line 4 |
| Sample 4 | → output frame 1D, line 0 |

FIG. 5F

Time Increment = 16

Row #

| # | Action |
|---|---|
| 0 | reset |
| 1 | sample to 4 |
| 2 | integrate |
| 3 | integrate |
| 4 | reset |
| 5 | sample to 3 |
| 6 | integrate |
| 7 | integrate |
| 8 | reset |
| 9 | sample to 2 |
| 10 | integrate |
| 11 | integrate |
| 12 | reset |
| 13 | sample to 1 |
| 14 | integrate |
| 15 | Integrate |

| Sample | Output |
|---|---|
| Sample 1 | → output frame 1A, line 13 |
| Sample 2 | → output frame 1B, line 9 |
| Sample 3 | → output frame 1C, line 5 |
| Sample 4 | → output frame 1D, line 1 |

FIG. 5G

Time Increment = 19

| Row # | |
|---|---|
| 0 | sample to 1 |
| 1 | integrate |
| 2 | integrate |
| 3 | reset |
| 4 | sample to 4 |
| 5 | integrate |
| 6 | integrate |
| 7 | reset |
| 8 | sample to 3 |
| 9 | integrate |
| 10 | integrate |
| 11 | reset |
| 12 | sample to 2 |
| 13 | integrate |
| 14 | integrate |
| 15 | reset |

| | |
|---|---|
| Sample 1 | → output frame 2A, line 0 |
| Sample 2 | → output frame 1B, line 12 |
| Sample 3 | → output frame 1C, line 8 |
| Sample 4 | → output frame 1D, line 4 |

FIG. 5H

Time Increment = 24

Row #

| Row | Action |
|---|---|
| 0 | reset |
| 1 | sample to 2 |
| 2 | integrate |
| 3 | integrate |
| 4 | reset |
| 5 | sample to 1 |
| 6 | integrate |
| 7 | integrate |
| 8 | reset |
| 9 | sample to 4 |
| 10 | integrate |
| 11 | integrate |
| 12 | reset |
| 13 | sample to 3 |
| 14 | integrate |
| 15 | integrate |

| | |
|---|---|
| Sample 1 | → output frame 2A, line 5 |
| Sample 2 | → output frame 2B, line 1 |
| Sample 3 | → output frame 1C, line 13 |
| Sample 4 | → output frame 1D, line 9 |

FIG. 5I

SYSTEMS, DEVICES AND METHODS FOR DIGITAL CAMERA IMAGE STABILIZATION

FIELD OF THE INVENTION

The present invention relates to the field of digital imaging, and more particularly to the field of improving the sharpness or resolution of digital images by reducing, minimizing or substantially eliminating effects induced by camera shake.

BACKGROUND

The proliferation of low-cost microprocessors, memory and image capture electronics has made digital still and video cameras popular and widely available. One advantage of digital cameras over conventional film cameras is their ability to capture an image and place it in memory for subsequent digital manipulation. Conversely, in film cameras captured images are permanently exposed on film and may not be manipulated within the camera.

Vibration or "camera shake" is one of the photographer's worst enemies. Camera shake induces blur in images owing to camera movement during image exposure. Slow shutter speeds and telephoto lenses exacerbate the effects of camera shake. Sharp photographs have higher resolution, require smaller file sizes for web use, and permit higher compression ratios than otherwise similar but less sharp photographs.

Several approaches have been developed to counteract the effects of camera shake. The oldest of these is the tripod, which can be very effective in minimizing the effects of camera shake. Unfortunately, tripods can be expensive, cumbersome, inconvenient, and time-consuming to use.

Another approach employs using an image stabilization device that counteracts camera shake. One or more elements located within the camera move in a direction opposite the camera's movement during image exposure. Some image-stabilized lenses and cameras use several tiny gyros that precess with camera movement and send signals via one or more servomotors to cause a lens element, a prism, or the image sensor to move in a direction opposite that of the camera's movement. Examples of this type of technology include the NIKON VR™ lens series and the CANON IS™ lens series. Some KONICA™ DIMAGE™ cameras include an "anti-shake" feature, where the image sensor itself is moved along the focal plane to stabilize images. Although image-stabilized lenses and image sensors perform relatively well, they are nevertheless relatively expensive and therefore generally found only in "prosumer" cameras.

Yet another approach to image stabilization is to employ a gyroscopic stabilizing platform upon which a camera is mounted, such as the KENYON LABORATORIES™ Gyro Stabilizer or the PEACE RIVER™ GYROPRO™ stabilizer. Gyro stabilization platforms are relatively bulky, difficult to use and expensive, however.

What is needed is a less expensive, less complicated, less bulky and easier to use method and device for stabilizing digital images.

Various patents containing subject matter relating directly or indirectly to the field of the present invention include, but are not limited to, the following:

U.S. Pat. No. 5,550,935 to Erdem et al. for "Method for multiframe Wiener restoration of noisy and blurred image sequences," Aug. 27, 1996.

U.S. Pat. No. 5,657,402 to Bender et al. for "Method of creating a high resolution still image using a plurality of images and apparatus for practice of the method," Aug. 12, 1997.

U.S. Pat. No. 5,696,848 to Pet al. for "System for creating a high resolution image from a sequence of lower resolution motion images," Dec. 9, 19.

U.S. Pat. No. 5,767,987 to Wolff et al. for "Method and apparatus for combining multiple image scans for enhanced resolution," Jun. 16, 1998.

U.S. Pat. No. 5,920,657 to Bender et al. for "Method of creating a high resolution still image using a plurality of images and apparatus for practice of the method," Jul. 6, 1999.

U.S. Pat. No. 6,075,905 to Herman et al. for "Method and apparatus for mosaic image construction," Jun. 13, 2000.

U.S. Pat. No. 6,173,087 to Kumar et al. for "Multi-view image registration with application to mosaicing and lens distortion correction," Jan. 9, 2001.

U.S. Pat. No. 6,208,765 to Bergen for "Method and apparatus for improving image resolution," Mar. 27, 2001.

U.S. Pat. No. 6,285,804 to Crinon et al. for "Resolution improvement from multiple images of a scene containing motion at fractional pixel values," Sep. 4, 2001.

U.S. Pat. No. 6,320,979 to Melen for "Depth of field enhancement," Nov. 20, 2001.

U.S. Pat. No. 6,535,650 to Poulo et al. for "Creating high resolution images," Mar. 18, 2003.

U.S. Pat. No. 6,650,704 to Carlson et al. for "Method of producing a high quality, high resolution image from a sequence of low quality, low resolution images that are undersampled and subject to jitter," Nov. 18, 2003.

U.S. Pat. No. 6,804,419 to Miyake for "Image processing method and apparatus," Oct. 12, 2004.

U.S. Pat. No. 6,940,555 to Okisu et al. for "Image taking apparatus having focus control," Sep. 6, 2005.

U.S. Pat. No. 6,975,352 to Seeger et al. for "Apparatus and method for capturing a composite digital image with regions of varied focus and magnification," Dec. 13, 2005.

U.S. Pat. No. 7,046,401 to Dufaux et al. for "Camera-based document scanning system using multiple-pass mosaicking," May 16, 2006.

U.S. Pat. No. 7,084,910 to Amerson et al. for "System and method for using multiple images in a digital image capture device," Aug. 1, 2006.

U.S. Pat. No. 7,116,359 to Kitamura et al. for "Image capture device and method of controlling blur in captured images," Oct. 3, 2006.

U.S. Patent Publication No. 20030117412 to Brooksby et al. et al. for "Method for high dynamic range image construction based on multiple images with multiple illumination intensities," Jun. 26, 2003.

U.S. Patent Publication No. 20010013895 to Aizawa et al. for "Arbitrarily focused image synthesizing apparatus and multi-image simultaneous capturing camera for use therein," Aug. 16, 2001.

The dates of the foregoing publications may correspond to any one of priority dates, filing dates, publication dates and issue dates. Listing of the above patents and patent applications in this background section is not, and shall not be construed as, an admission by the applicants or their counsel that one or more publications from the above list constitutes prior art in respect of the applicant's various inventions. All printed publications and patents referenced herein are hereby incorporated by referenced herein, each in its respective entirety.

Upon having read and understood the Summary, Detailed Descriptions and Claims set forth below, those skilled in the art will appreciate that at least some of the systems, devices, components and methods disclosed in the printed publications listed herein may be modified advantageously in accordance with the teachings of the various embodiments of the present invention.

SUMMARY

Disclosed herein are various embodiments of systems, devices and methods for stabilizing digital images and thereby reducing or minimizing the effects of camera shake.

In one embodiment of the present invention, there is provided a digital image stabilization system comprising a sensor pixel array comprising an array of imaging pixels and at least first and second rolling shutters, a memory containing software, a processor, a lens operatively coupled to the sensor pixel array, and a relative position determination device. The sensor pixel array, memory, software, processor, lens and relative position determination device are operatively connected to one another and configured to capture at least one of simultaneously and near-simultaneously exposed at least first and second images of the same subject, at least portions of the first image being captured by the first rolling shutter while at least portions of the second image are being captured by the second rolling shutter; spatially align first and second data sets comprising individual data points based on information sensed and provided by the relative position determination device, where the first and second data sets correspond to pixel arrays containing analog pixel voltages, the pixel arrays forming the first and second images, respectively, and add individual data points from the aligned first and second data sets to form an output data set.

In another embodiment of the present invention, there is provided a digital image stabilization system comprising means for sensing light and storing same as analog voltages in a pixel array, the sensing and storing means further comprising at least first and second rolling shutter means, means for storing digital data and software code, means for processing data and executing the software code, a lens operatively coupled to the light sensing means, and means for sensing relative positions. The light sensing means, the digital data storage means, the software code, the processing means, the lens and the relative position sensing means are operatively connected to one another and configured to capture at least one of simultaneously and near-simultaneously exposed at least first and second images of the same subject, at least portions of the first image being captured by the first rolling shutter while at least portions of the second image are being captured by the second rolling shutter; spatially align first and second data sets comprising individual data points based on information sensed and provided by the relative position determination device, where the first and second data sets correspond to pixel arrays containing analog pixel voltages, the pixel arrays forming the first and second images, respectively, and add individual data points from the aligned first and second data sets to form an output data set.

In yet another embodiment of the present invention, there is provided a method of stabilizing digital images in an imaging device, comprising using the device to capture at least one of simultaneously and near-simultaneously a plurality of digital images of the same subject and storing same in a memory thereof as individual data sets, sensing the relative position corresponding to the device for each of the captured images and storing data representative of same in the memory, aligning the individual data sets on the basis of calculations performed using the data, and adding data points from each of the aligned set sets to form an output data set representative of an output image.

In addition to the foregoing embodiments of the present invention, review of the detailed description and accompanying drawings will show that there are still other embodiments of the present invention. Accordingly, many combinations, permutations, variations and modifications of the foregoing embodiments of the present invention not set forth explicitly herein will nevertheless fall within the scope of the present invention.

BRIEF DESCRIPTION OF THE DRAWINGS

Different aspects of the various embodiments of the present invention will become apparent from the following specification, drawings and claims in which:

FIGS. 5A through 5I illustrate the operation of a plurality of rolling shutters, a sensor pixel array and sample-and-hold registers according to one embodiment of the present invention.

The drawings are not necessarily to scale. Like numbers refer to like parts or steps throughout the drawings.

DETAILED DESCRIPTIONS OF SOME PREFERRED EMBODIMENTS

Set forth below are detailed descriptions of some preferred embodiments of the systems, devices and methods of the present invention. Disclosed herein are various embodiments of systems, devices and methods for providing image stabilization in a digital still camera, digital video camera or digital imaging system.

Figure 1:
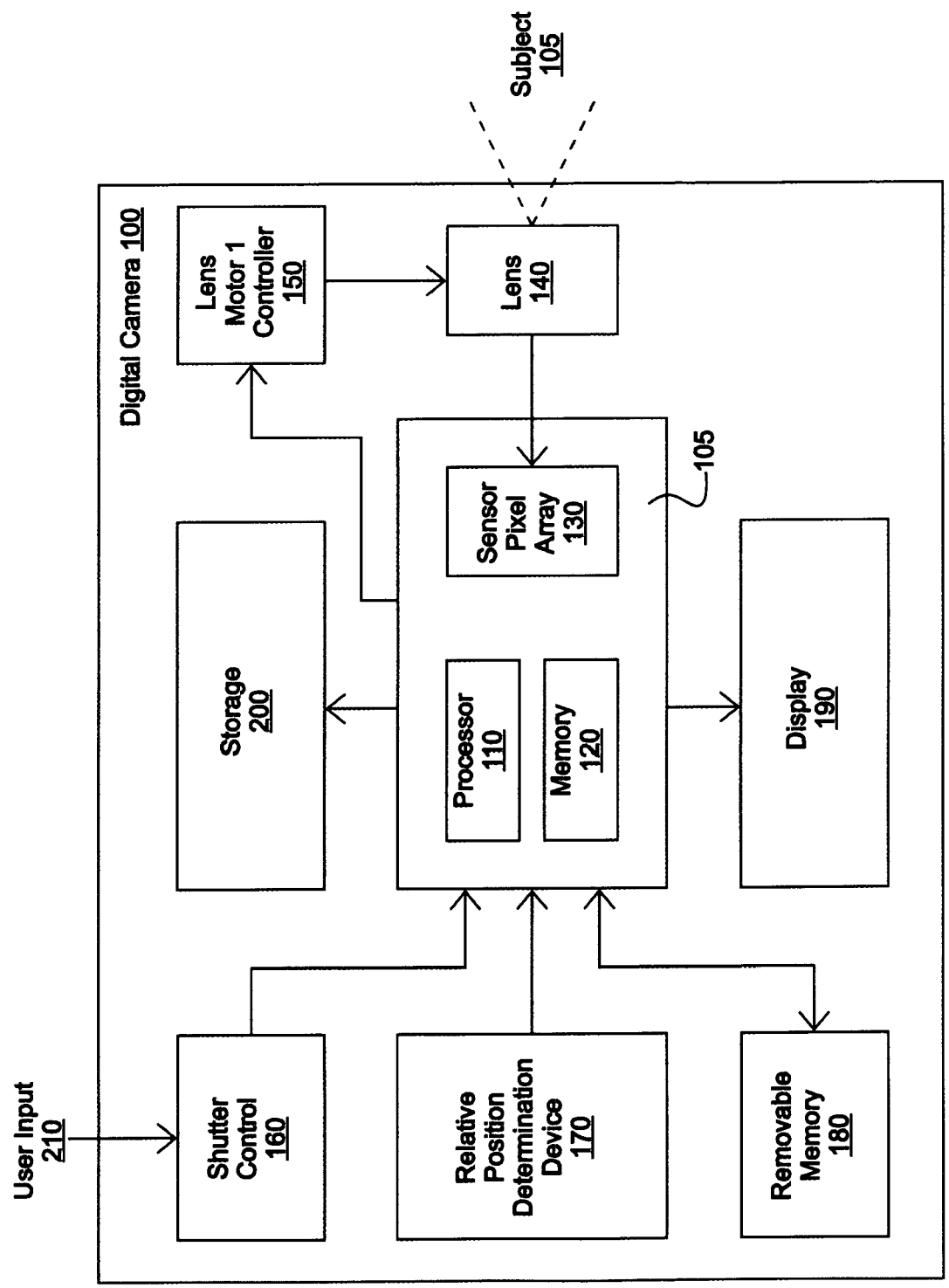
FIG. 1 shows a block diagram of one embodiment of digital image stabilization camera 100 of the present invention.

FIG. 1 shows a block diagram of one embodiment of digital image stabilization camera 100 of the present invention. Note, however, that block diagram illustrated in FIG. 1 may be adapted for use in a digital stabilization system or other implementation of the present invention. As shown in FIG. 1, digital camera 100 comprises lens 140, which images subject 105 selected by the user. Lens 140 preferably, although not necessarily, operates under the control of lens controller 150, which controls the aperture (i.e., exposure and depth-of-field) and focus of lens 140. (Note that camera 100 may have a fixed focus lens 140, in which case lens controller 150 is not required.) When the user triggers shutter control 160 via user input 210 (e.g., an electronically- or mechanically-actuated shutter button operated by the user), images of subject 105 are captured simultaneously or near-simultaneously by a plurality of rolling shutters, which are preferably incorporated into sensor pixel array 130 (more about which we say below).

The plurality of rolling shutters and sensor pixel array 130 operate under the control of processor 110 to cause the simultaneously or near-simultaneously captured images of subject 105 to be recorded by sensor pixel array 130 and transferred to memory 120. While the images of subject 105 are being captured simultaneously or near-simultaneously, relative position determination device 170 senses and records the relative spatial movement of camera 100 that occurs in respect of and between each captured image or frame arising from camera shake or vibration.

In memory 120, and under the control of processor 110, the simultaneously or near-simultaneously captured images of subject 105 are digitally manipulated to align the pixels thereof using relative position information corresponding to each image provided by device 170. Each pixel (or analog pixel voltage, or digital data point when stored in digital memory) in each image (or image data set when stored in digital memory 120) is shifted by an amount (x,y) calculated on the basis of information provided by device 170 before being added to the pixels (or data points) of other images (or image data sets) that have also been shifted using inputs from device 170. Pixels representing subject 105 are aligned in each image or data set so that subject 105 is positioned at the same (x,y) coordinates in each image before the pixels from different images are added together.

It will now be seen that the shifting and alignment of the pixels (or data points) of each captured image (or data set corresponding thereto), where the amount and direction of shift for each image or data set is calculated using information provided by device 170, and where aligned pixels or data points from simultaneously- or near-simultaneously-captured images or frames are added together, is capable of accomplishing substantially the same result (i.e., minimizing camera shake effects) as the real-time image stabilization techniques described above.

Continuing to refer to FIG. 1, the system and method for acquiring, aligning and combining simultaneously or near-simultaneously captured images to correct for camera shake may be implemented in hardware, software, firmware, or a combination thereof. In a preferred embodiment, the invention is implemented using a combination of hardware and software or firmware that is stored in a memory and that is executed by a suitable instruction execution system. The hardware portion of the invention may be implemented with any or a combination of the following technologies, which are all well known in the art: discrete logic circuits having logic gates for implementing logic functions upon data signals, application specific integrated circuits (ASICs) having appropriate combinational logic gates, programmable gate arrays (PGAs), field programmable gate array (FPGAs), and the like. Software or firmware may be implemented in a microprocessor, digital signal processor (DSP), reduced instruction set computer (RISC), or special purpose programmable processor.

One or more programs for acquiring, aligning and combining simultaneously or near-simultaneously captured images to correct for camera shake preferably comprise an ordered listing of executable instructions for implementing logical functions, and may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. A "computer-readable medium" may be any means capable of containing, storing, communicating, propagating or transporting such a program for use by or in connection with the instruction execution system, apparatus, or device. The computer readable medium may be, by way of example, an electronic, magnetic, optical, electromagnetic, infrared, or semiconductor system, apparatus, device, or propagation medium. Computer-readable mediums include portable computer diskettes, random access memory (RAM), read-only memory (ROM), erasable programmable read-only memory (EPROM or flash memory), optical disks, CDROMs and DVDs.

Continuing to refer to FIG. 1, processor 110 may be a special purpose or general purpose processor, such as a controller, a microcontroller, a CPU, an ASIC, a portion of an Imager (as described above), a computer, a microcomputer and the like. Memory 120 includes a number of software elements and storage locations, and can include, for example both volatile and non-volatile memory. For example, memory 120 may comprise random access memory (RAM), read only memory (ROM), or flash memory. Display 190 may be a liquid crystal display (LCD) or any other type of display that permits a user to view captured images and other camera operating parameters. Removable memory 180 may be, for example, a non-volatile memory such as a removable flash card. Sensor pixel array 130 may comprise a charge coupled device (CCD) sensor, a complimentary metal oxide semiconductor (CMOS) sensor or other suitable type of sensor.

Relative position determination device 170 in FIG. 1 is most preferably a MEMS-type gyroscope or angular rate sensor, although other types of gyroscopically-driven or relative spatial position determination devices may also be employed in the various embodiments of the present invention. Examples of MEMS-type devices that may be adapted for use in the present invention include the EPSON™ XV-3500CB angular velocity gyro-sensor, the NEC™ TOKIN™ piezoelectric gyroscope, ANALOG DEVICES™ iMEMS™ series of gyroscopes, the ANALOG DEVICES™ ADXRS300 angular rate sensor, and the SILCON SENSING SYSTEMS™ Silicon VSG "CRS-03" Rate Gyroscope™.

The following publications submitted on even date herewith in the Information Disclosure Statement accompanying the present application are hereby incorporated into the specification hereof, each in its respective entirety: (1) Data Sheet for ANALOG DEVICES™ ADXRS300 Angular Rate Sensor; (2) "An Overview of MEMS Inertial Sensing Technology—Sensors" by Jonathan Berstein, Corning-IntelliSense Corp., http://www.sensormag.com/articles/0203/14/; (3) "Silicon VSG Rate Gyroscope 'CRS-03'," http://www.ssp-.co.jp./sssj/silicon-e.html; (4) "Good Vibrations from Epson's New Gyro-Sensor" by John Boyd, Technology Newsline 12, February, 2005; and (5) "Removing Camera Shake from a Single Photograph" by Fergus et al., ACM Transactions on Graphics, Volume 25, Issue 3, July, 2006.

Figure 2:
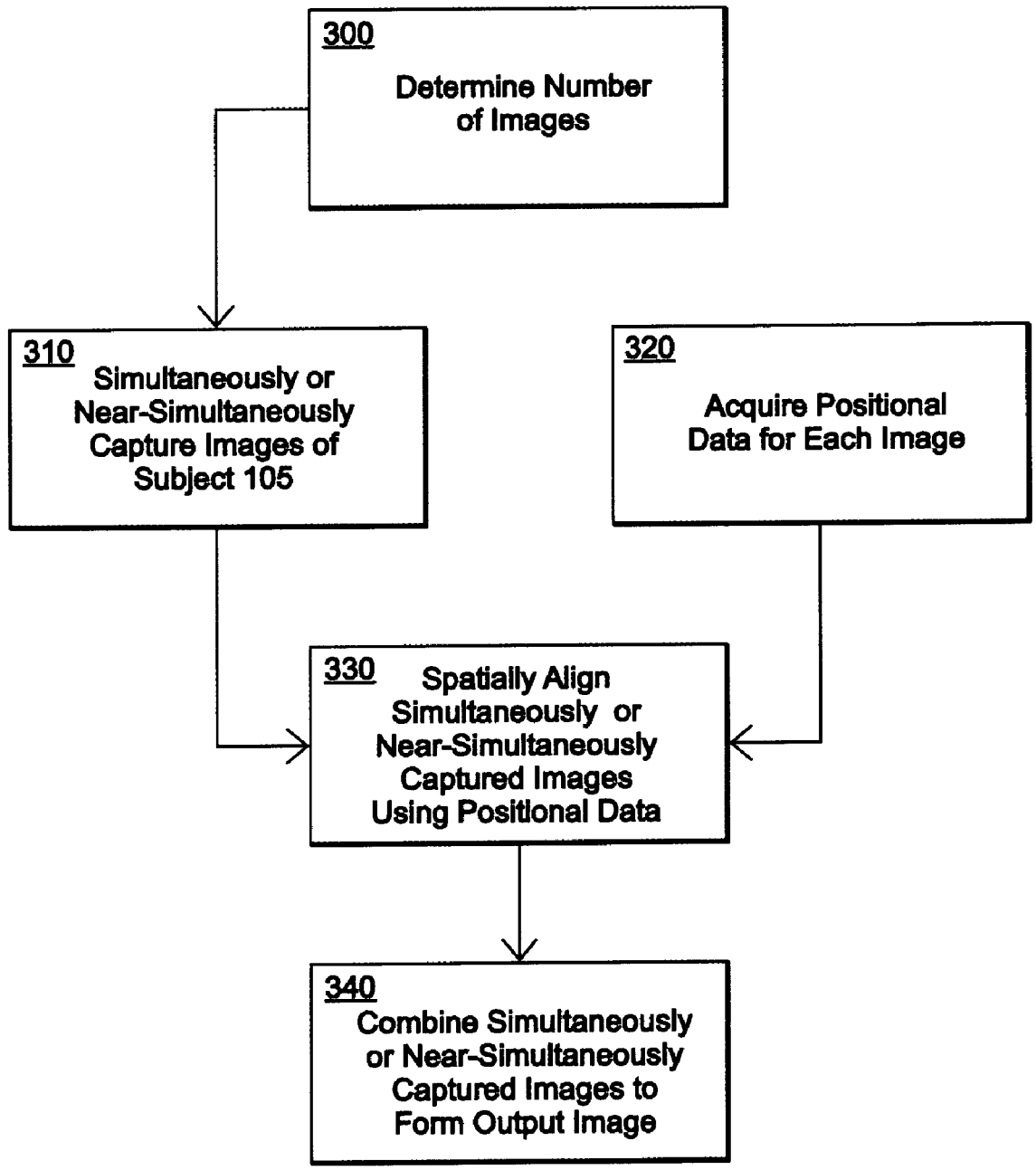
FIG. 2 shows a method of providing image stabilization according to one embodiment of the present invention.

Referring now to FIG. 2, there is shown a method of providing image stabilization according to one embodiment of the present invention. In step 300, a user and/or a suitable algorithm determines the number of images of subject 105 that are to be simultaneously or near-simultaneously captured and subsequently aligned and combined in memory 120. The number of images that are to be captured may be determined on the basis of a number of different factors, including hardware constraints, user input or programming, automatic programming of camera 100, ambient image exposure conditions, the focal length of lens 140 at the moment the images are to be successively captured, whether subject 105 is stationary or moving, the amount of relative camera shake detected by device 170, and other pertinent factors. Hardware constraints include, but are not limited to, the speed with which the rolling shutter is capable of operating, the column operating time of sensor pixel array 130, the total number of pixels in sensor pixel array 130, the maximum clock speed at which sensor pixel array 130 is capable of operating, the speed at which sample-and-hold devices connected to sensor pixel array 130 are capable of moving data, and the speed at which an A/D converter connected to the sample-and-hold devices is capable of operating.

Continuing to refer to FIG. 2, in step 310 images of subject 105 are captured simultaneously or near-simultaneously by analog sensor pixel array 130 and then stored digitally in memory 120. Depending on the nature of subject 105 (e.g., light or dark, moving or stationary) and ambient light conditions, images of subject 105 may be required to be captured simultaneously, near-simultaneously or in quick succession, or not. For example, if subject 105 is a moving object illuminated under daylight conditions that the user keeps within the view frame while triggering shutter control 160, it may be advantageous for images to be captured simultaneously or near-simultaneously with short exposure times for each captured image. If subject 105 is a stationary object being photographed under low-light conditions, however, better results might be obtained if longer exposure times are employed in individual images, and if the images are not captured simultaneously, near-simultaneously or in quick succession.

Preferably in parallel with step 310, at step 320 changes in the relative spatial position of camera 100 are sensed by relative position determination device 170 in respect of each captured image. These changes in relative position are stored in memory 120 as positional data corresponding to each captured frame. Such data permit changes in spatial direction and magnitude to be calculated by processor 110 for each captured image.

In step 330, the individual pixel arrays stored in memory 120 representing the simultaneously or near-simultaneously captured images are spatially aligned in respect of one another using the changes in relative spatial position calculated by processor 110. In step 340, the individual pixels from each image are combined or added to produce an output image.

Figure 3:
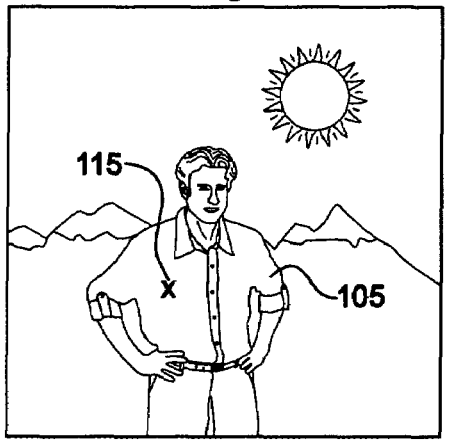
FIG. 3 illustrates an example of how simultaneously- or near-simultaneously-captured digital images may be shifted spatially and aligned in respect of one another before the pixels of the individually-captured images are combined.
Figure 3:
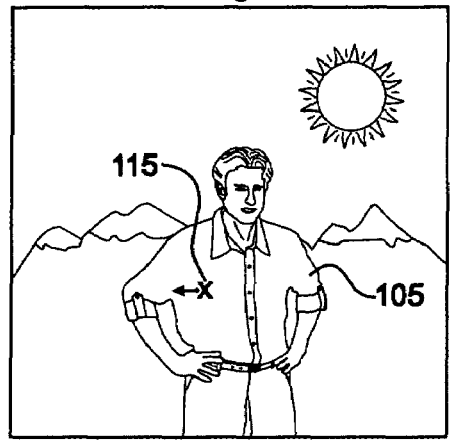
Figure 3:
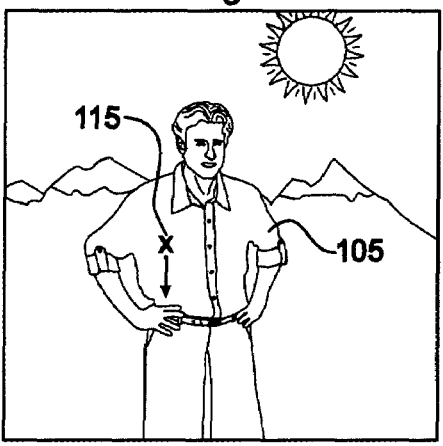
Figure 3:
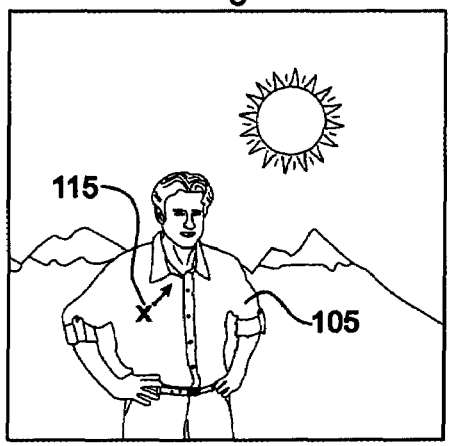
Figure 3:
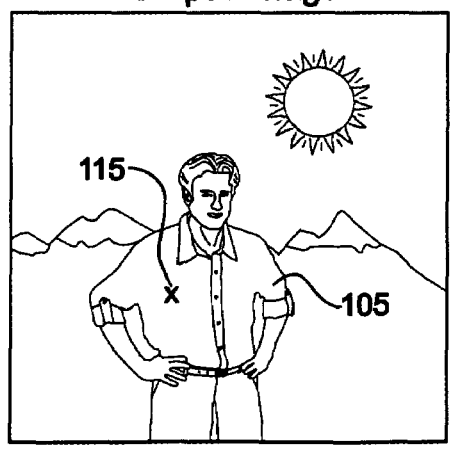
Figure 4:
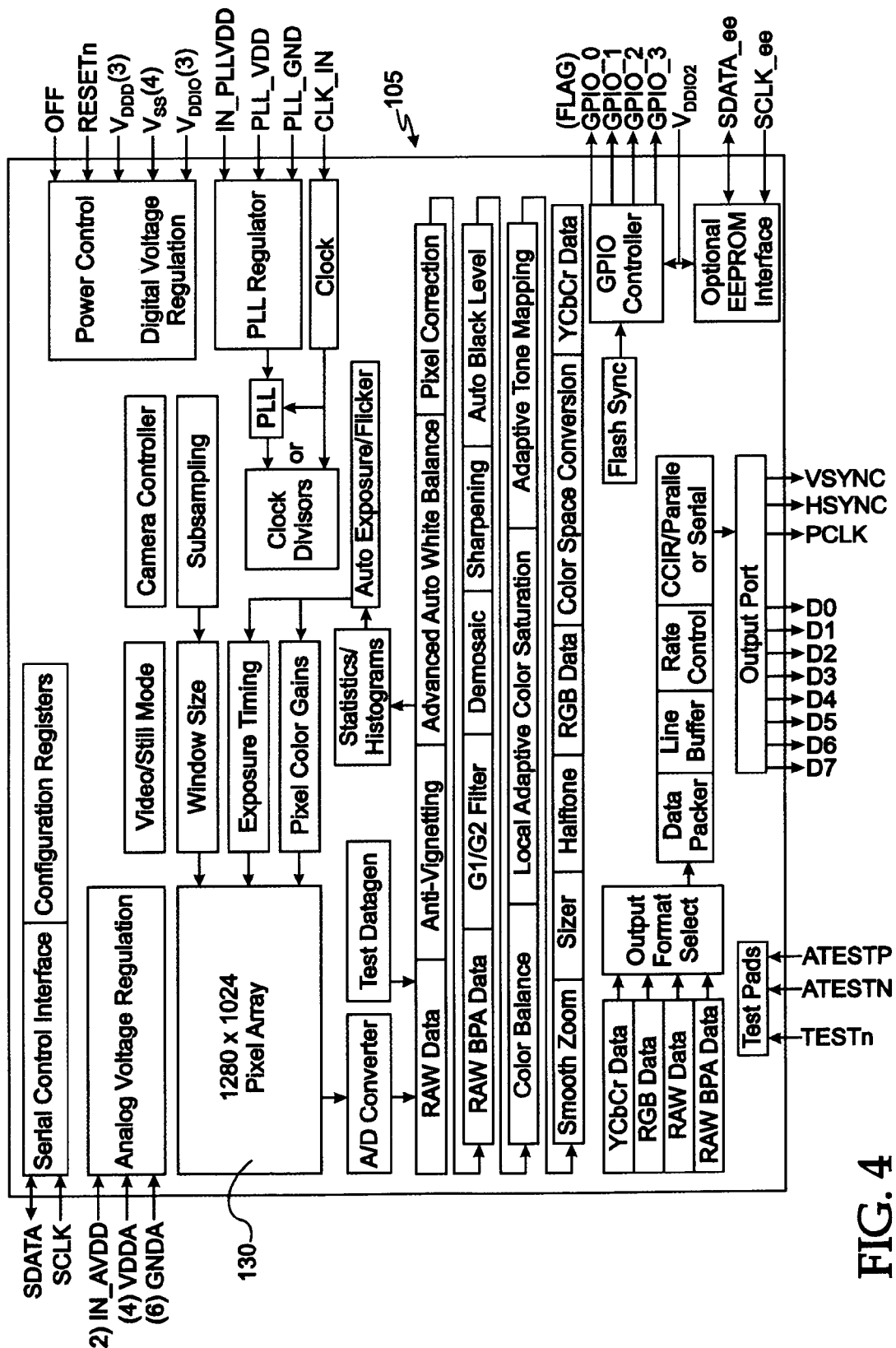
FIG. 4 shows a block diagram of an AVAGO TECHNOLOGIES™ ADCC-3000 Imager.

FIG. 3 illustrates an example of how successively-captured digital images may be shifted spatially and aligned in respect of one another before the pixels or data points of individually-captured images are combined. (Note that for clarity and illustrative purposes, each of images 1 through 4 shown in FIG. 3 is represented as having been properly exposed, although in some embodiments of the present invention the individually-captured images may be underexposed or even overexposed.) The "X" in Images 1 through 4 denotes an arbitrarily-defined reference point on subject 105 that is provided to facilitate subsequent discussion herein of the manner in which the pixels or data points of individually-captured images or data sets are spatially shifted before being added together. Image 1 represents the first of four images of subject 105 captured in succession; Images 2, 3 and 4 represent individual images captured near-simultaneously or in quick succession and in ascending numerical order after Image 1 has been captured. Relative to Image 1, it will be seen that subject 105 in FIG. 2 is shifted to the right, and must be shifted leftwards (as indicated by the left-pointing arrow of FIG. 2) to align with subject 105 of FIG. 1. Relative to Image 1, it will be seen that subject 105 in FIG. 3 is shifted upwards, and must be shifted downwards (as indicated by the down-pointing arrow of FIG. 3) to align with subject 105 of FIG. 1. Relative to Image 1, it will be seen that subject 105 in FIG. 4 is shifted downwards and to the left, and must be shifted upwards and to the right (as indicated by the up- and right-point arrow of FIG. 4) to align with subject 105 of FIG. 1. Image 5 represents the output image resulting from adding the pixels or data points of individual images or image data sets that have been spatially aligned with one another before pixels are combined.

Referring now to FIGS. 1 through 3, note that if each of the images captured simultaneously, near-simultaneously or in rapid succession of subject 105 is underexposed under the control of processor 110 by an amount equal to the relative proportion of proper exposure time corresponding to a properly exposed single image, then the image or frame resulting from the combination of aligned pixels will exhibit not only minimized camera shake effects, but also proper exposure. If, on the other hand, the individual images captured in rapid succession of subject 105 are properly exposed under the control of processor 110, then digital image processing techniques may be employed in processor 110 to adjust gain and word bits corresponding to each pixel in each image so that the resulting final image comprising combined pixels is properly exposed.

Those skilled in the art will understand that in addition to pixel alignment, a virtually infinite number of digital signal processing techniques may be applied to the individual digital image data sets stored in memory 120 before pixels or data points are combined. Such digital signal processing techniques include, but are not limited to, white balancing, compensating for slight color shifts under different light conditions (e.g., daylight, fluorescent and incandescent light), auto-exposure compensating, anti-vignetting, auto black level compensating, auto flicker compensating, color correction compensating, saturation level compensating, color space converting, changing data or pixel format, demosaicking, gamma correcting, halftoning, desaturating, changing pixel color gains, pixel mismatch correcting, pixel sharpening, subsampling, median filtering, spatial filtering, frequency-wavenumber processing, color processing, and color adjusting. In addition, the combination or summation of aligned pixels or data points has the advantage of reducing random noise present in individual images or image data sets according to the square root of the sum of the number of individual pixels or data points added or stacked together for each resulting output pixel or output data point.

FIG. 4 shows a block diagram of an AVAGO TECHNOLOGIES ADCC-3000 Imager, which may be adapted to perform in accordance with the teachings of the present invention. Further details concerning the ADCC-3000 Imager may be found in the AVAGO TECHNOLOGIES data sheet for the ADCC-3000 product, the entirety of which is hereby incorporated by reference herein. Another example of a product that may adapted for use in the present invention is the AVAGO TECHNOLOGIES ADCC-3850 CMOS image sensor, the AVAGO TECHNOLOGIES data sheet for which is also hereby incorporated by reference herein in its entirety.

Continuing to refer to FIG. 4, the ADCC-3000 imager is a single custom integrated circuit containing an image sensor and an image processor (sometimes called an image pipeline). The sensor is controlled using a serial control interface to the integrated circuit. The ADCC-3000 imager is typically incorporated into a camera module.

To begin an exposure, the top pixel row of the viewing window is reset. After reset, the row begins integration (i.e., exposure, or permitting light to shine on pixels in the row until enough photons have been collected therein to render an image of sufficient quality). After one row process time elapses, the next row is reset. This continues until the bottom row of the viewing window is reached. In continuous run mode, the process repeats by wrapping to the top row of the viewing window. In single frame capture mode, the process ends when the bottom row of the viewing window is reached. In continuous run mode, if the integration time is less than the time to cycle through a frame there is no overhead time between frames. If the integration time is greater than the time to cycle through a frame, there is an overhead delay between frames equal to integration time minus the time to cycle through a frame.

The image sensor of the ADCC-3000 Imager (which corresponds to sensor pixel array 130 of FIG. 1) has a 1.3 Mega pixel rectangular pixel array of 1280 columns by 1024 rows. Because 10 bits are needed for the array, and the registers are 8 bits wide, a window MSB (WIN_MSB) register is used for the upper 2 bits of each register. The lens normally covers the entire landscape SXGA area; as the window size changes the field of view, the effective focal length of the lens changes. Starting and stopping rows and columns can be individually controlled, and windows smaller that 1280×1024 can be placed anywhere on the sensor.

FIGS. 5A through 5I illustrate the operation of a plurality of rolling shutters, sensor pixel array 130 and sample-and-hold registers according to one embodiment of the present invention. For the sake of simplicity, and to illustrate the operation of a plurality of rolling shutters capable of the simultaneous or near-simultaneous capture of images, FIGS. 5A through 5I show sensor pixel array 130 as comprising only 16 rows by 1,280 columns of pixels. In actual use, pixel sensor array 130 would likely comprise many more rows, such as the 1,024 rows of the ADCC-3000 imager.

Figure 5A:
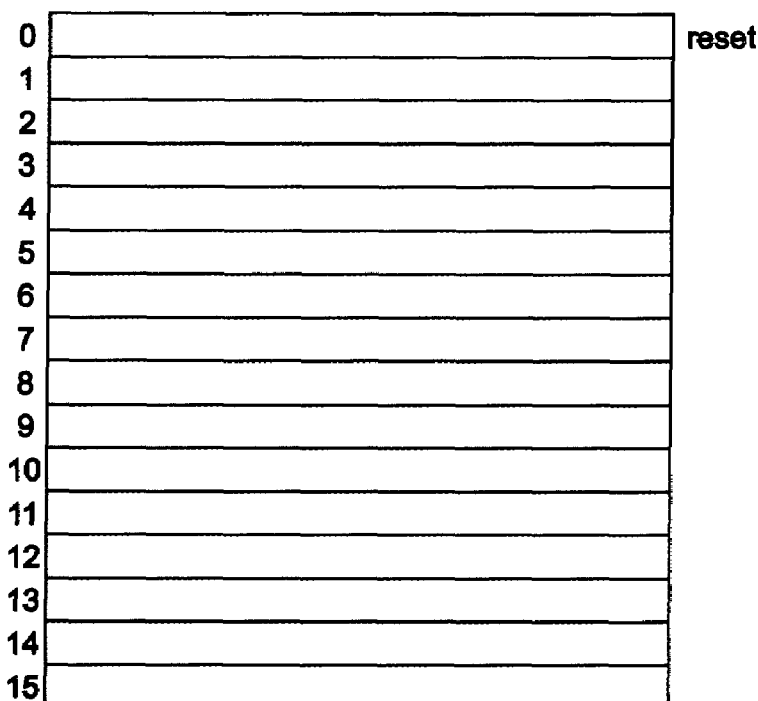
Figure 5A:
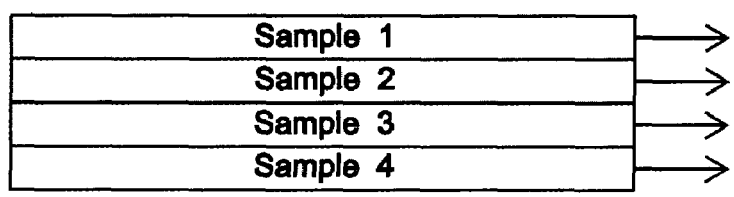
Figure 5B:
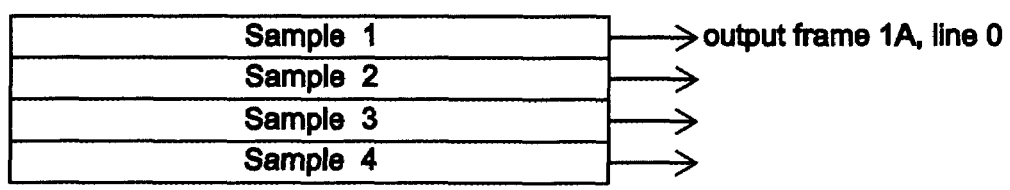

As will be seen, the embodiment of the present invention illustrated in FIGS. 5A through 5I captures four simultaneously or near-simultaneously captured images using four separate rolling shutters for each output image or frame of subject 105 that is to be generated. As described in detail below, the plurality of rolling shutters of the present invention may all be active at the same moment in time, or only one such shutter may be active at a given moment in time, depending on where in the image acquisition sequence one observes pixel sensor array 130. For example, FIG. 5B shows only a first rolling shutter in operation at time T=3, while FIG. 5F shows four rolling shutters in operation at time T=16.

As noted above, however, the present invention includes within its scope any number of simultaneously or near-simultaneously captured images or frames that are to be spatially aligned and combined to form a single output image. In actual practice, the number of images or frames captured in a given device, in addition to be being determined by exposure conditions, automatic programming and user input, will often be determined by hardware constraints, such as imager speed, number of A/D converters available and desired dynamic range, as well as programming limitations and other considerations.

One feature distinguishing some embodiments of the present invention from prior art image stabilization devices and methods solutions is the nearly simultaneous or simultaneous capture of multiple frames or images using a plurality of rolling shutters. Instead of employing one active rolling shutter to acquire images or frames, at least two rolling shutters capture images simultaneously or near-simultaneously so that the time windows over which individual frames are taken overlap with one another. This permits the composite frame rate of the camera to be maintained at the same speed as would otherwise be provided by a comparable pixel sensor array 130 containing a single rolling shutter. But for the plurality of rolling shutters provided in the present invention, the frame rate would be reduced by a factor equaling 1/(number of acquired frames of image 105).

Referring now to FIG. 5A, there is shown sensor pixel array 130 comprising an array of 16 rows (rows 0 to 15) by 1,280 columns of pixels. As noted in FIG. 5A, the exposure time of the individual images captured by pixel sensor array 130 in FIGS. 5A through 5I is set at the amount of time required to fill 3 rows of pixels. In actual use, such an exposure time would likely be set by an auto-exposure routine executed by processor 110, or by the user. As an example of how exposure times work in the context of one embodiment of sensor pixel array 130, if the exposure time of each captured image is to be set at 1/15 of a second, individual frames need to be acquired at a rate of 15 frames per second. With, for example, 1,024 rows available in sensor pixel array 130 of FIG. 4, 150 microseconds would be available to expose each row in sensor pixel array 130. Referring still to FIG. 5A, note that at time increment=0, the individual pixels in row 0 have been reset to blank values of zero.

Referring now to FIG. 5B, at time increment=3, the analog pixel voltages stored in the 1,280 columns of row 0 are read out simultaneously for storage in analog sample-and-hold register 1 ("Sample to 1") before being output therefrom to an A/D converter (not shown in FIGS. 5A through 5I) as frame 1A, line 0. The A/D converter operates on rows of pixel voltages sequentially and as they are presented in turn to the A/D converter. Each row of analog data requires the A/D converter to operate over 1,280 clock cycles (equivalent to the number of columns in each row). Digital row values are stored in memory 120 and organized according to the rows and columns of individually captured frames. Ideally, there is at least one A/D converter corresponding to each of the sample-and-hold registers 1 through 4 shown in FIGS. 5A through 5I, or less desirably a single A/D converter servicing all four registers that is capable of operating at very high speeds. Also at time increment=3, rows 1 and 2 are being "integrated" or light is being collected by the pixels thereof during exposure, while row 3 is being reset to blank values of zero. Resetting of a row can be accomplished very quickly (e.g., 1 microsecond). The sampling and holding of a row can also be accomplished in a short period of time (e.g., 5 to 15 microseconds).

Figure 5C:
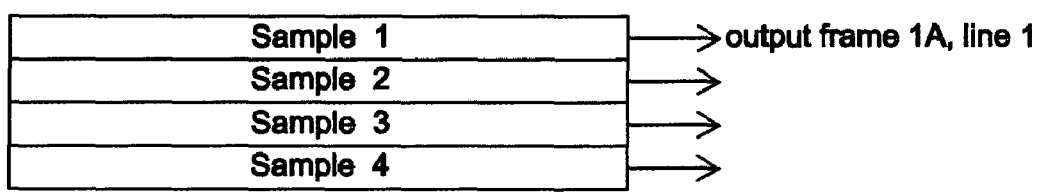

FIG. 5C shows the operation of sensor pixel array 130 at time increment=4, where row 0 is being reset, the analog pixel voltages stored in row 1 are read out simultaneously for storage in analog sample-and-hold register 1 ("Sample 1") before being output therefrom to an A/D converter as frame 1A, line 1. Also at time increment=4, rows 2 and 3 are being "integrated" or light is being collected by the pixels thereof during exposure, while row 4 is being reset to blank values of zero.

Figure 5D:
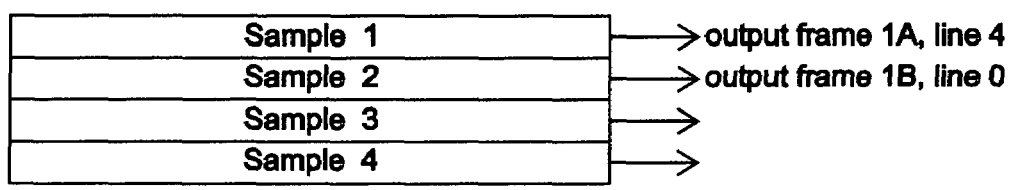

FIG. 5D shows the operation of sensor pixel array 130 at time increment=7, where the analog pixel voltages stored in row 0 are read out simultaneously for storage in analog sample-and-hold register 2 ("Sample to 2") before being output therefrom to an A/D converter as frame 1B, line 0, and the analog pixel voltages stored in row 4 are read out simultaneously for storage in analog sample-and-hold register 1 ("Sample to 1") before being output therefrom to an A/D converter as frame 1B, line 0. Meanwhile, rows 1, 2, 5 and 6 are being integrated (or light is being collected by the pixels thereof during exposure), while rows 3 and 7 are being reset to blank values of zero.

FIG. 5E shows the operation of sensor pixel array 130 at time increment=9, where the analog pixel voltages stored in row 2 are read out simultaneously for storage in analog sample-and-hold register 2 ("Sample to 2") before being output therefrom to an A/D converter as frame 1B, line 2, and the analog pixel voltages stored in row 6 are read out simultaneously for storage in analog sample-and-hold register 1 ("Sample to 1") before being output therefrom to an A/D converter as frame 1A, line 6. Meanwhile, rows 0, 3, 4, 7 and 8 are being integrated (or light is being collected by the pixels thereof during exposure), while rows 1, 5 and 9 are being reset to blank values of zero.

Referring now to FIG. 5F, there is shown the operation of sensor pixel array 130 at time increment=15, where the analog pixel voltages stored in rows 0, 4, 8 and 12 are read out simultaneously for storage in analog sample-and-hold registers 4, 3, 2 and 1, respectively, before being output therefrom to an A/D converter as frame 1A, line 12, frame 1B, line 8, frame 1C, line 4 and frame 1D, line 0, respectively. Meanwhile, rows 1, 2, 5, 6, 9, 10, 13 and 14 are being integrated (or light is being collected by the pixels thereof during exposure), while rows 3, 7, 11 and 15 are being reset to blank values of zero.

Referring now to FIG. 5G, there is shown the operation of sensor pixel array 130 at time increment=16, where the analog pixel voltages stored in rows 1, 5, 9 and 13 are read out simultaneously for storage in analog sample-and-hold registers 4, 3, 2 and 1, respectively, before being output therefrom to an A/D converter as frame 1A, line 13, frame 1B, line 9, frame 1C, line 5 and frame 1D, line 1, respectively. Meanwhile, rows 2, 3, 6, 7, 10, 11, 14 and 15 are being integrated (or light is being collected by the pixels thereof during exposure), while rows 0, 4, 8 and 12 are being reset to blank values of zero.

Referring now to FIG. 5H, there is shown the operation of sensor pixel array 130 at time increment=19, where the analog pixel voltages stored in rows 0, 4, 8, and 12 are read out simultaneously for storage in analog sample-and-hold registers 4, 3, 2 and 1, respectively, before being output therefrom to an A/D converter as frame 2A, line 0, frame 1B, line 12, frame 1C, line 8 and frame 1D, line 4, respectively. Meanwhile, rows 1, 2, 5, 6, 9, 10, 12 and 14 are being integrated (or light is being collected by the pixels thereof during exposure), while rows 3, 7, 11 and 15 are being reset to blank values of zero.

FIG. 5I shows shown the operation of sensor pixel array 130 at time increment=24, where the analog pixel voltages stored in rows 1, 5, 9 and 13 are read out simultaneously for storage in analog sample-and-hold registers 4, 3, 2 and 1, respectively, before being output therefrom to an A/D converter as frame 2A, line 5, frame 2B, line 1, frame 1C, line 13 and frame 1D, line 9, respectively. Meanwhile, rows 2, 3, 6, 7, 10, 11, 14 and 15 are being integrated (or light is being collected by the pixels thereof during exposure), while rows 0, 4, 8 and 12 are being reset to blank values of zero.

It will now have become apparent that the rolling sequence of resetting, integrating, sampling and outputting of pixel values in pixel sensor array 130 illustrated in FIGS. 5A through 5I results in a plurality of rolling shutters that move progressively downward through the rows of pixel sensor array 130 while pixel data that have already been sensed are being shuttled first to sample-and-hold registers 1 through 4, then through one or more A/D converters, and finally to memory 120.

In one embodiment of the present invention, after pixel data corresponding to each of the four images captured simultaneously or near-simultaneously in the manner illustrated in FIGS. 5A through 5I have been digitized and stored in memory 120, relative position data provided by relative position determination device 170 are associated with each captured image. These data are then used to calculate the spatial shifts that need to be applied to each image before the data points thereof may be combined or summed to correct for camera shake. After appropriate spatial shifts have been calculated and applied to the arrays of data points corresponding to the individual captured images stored in memory 120, the various image data sets are added or summed together under the control of processor 110 to provide an output image. The output image may be further digitally manipulated under the control of processor 110, and/or may be stored in storage 200, removable memory 180 or shown on display 190.

The preceding specific embodiments are illustrative of the practice of the invention. It is to be understood, therefore, that other expedients known to those skilled in the art or disclosed herein may be employed without departing from the invention or the scope of the appended claims. For example, the present invention is not limited to use in CMOS sensors, and may be employed in other types of semiconductor imaging devices such as charge coupled devices (CCDs). Imaging, analog memory, digital memory and processor portions of integrated circuits may be physically separated from circuitry having other types of functionality and therefore need not reside on the same integrated circuit. Moreover, but depending on the particular context in which they are employed, the individual steps corresponding to the various methods of the present invention disclosed herein need not be practiced in the same order described in the specification, drawings and claims hereof.

Having read and understood the present disclosure, those skilled in the art will now understand that many combinations, adaptations, variations and permutations of known digital image stabilization systems, devices, components and methods may be employed successfully in the present invention.

In the claims, means plus function clauses are intended to cover the structures described herein as performing the recited function and their equivalents. Means plus function clauses in the claims are not intended to be limited to structural equivalents only, but are also intended to include structures which function equivalently in the environment of the claimed combination.

All printed publications and patents referenced hereinabove are hereby incorporated by referenced herein, each in its respective entirety.

We claim:

1. A digital image stabilization system, comprising:
a sensor pixel array comprising an array of imaging pixels and at least first and second rolling shutters;
a memory containing software;
a processor;
a lens operatively coupled to the sensor pixel array, and
a relative position determination device;
wherein the sensor pixel array, memory, software, processor, lens and relative position determination device are operatively connected to one another and configured to: (a) capture simultaneously exposed at least first and second images of the same subject, at least portions of the first image being captured by the first rolling shutter while at least portions of the second image are being captured by the second rolling shutter; (b) spatially align first and second data sets comprising individual data points based on information sensed and provided by the relative position determination device, where the first and second data sets correspond to pixel arrays containing analog pixel voltages, the pixel arrays forming the first and second images, respectively, and (c) add individual data points from the aligned first and second data sets to form an output data set.

2. The digital image stabilization system of claim 1, wherein the system is configured to capture individually underexposed at least first and second images.

3. The digital image stabilization system of claim 1, wherein the system is configured to capture individually properly exposed at least first and second images.

4. The digital image stabilization system of claim 1, wherein the system further comprises at least one analog sample-and-hold register for receiving, storing and transmitting a series of analog voltages corresponding to pixel analog voltages to an analog-to-digital converter or a buffer.

5. The digital image stabilization system of claim 4, wherein the system further comprises at least one analog-to-digital converter located between an output of the at least one analog sample-and-hold register and an input to the memory.

6. The digital image stabilization system of claim 1, wherein the relative position determination device is an angular rate sensor.

7. The digital image stabilization system of claim 1, wherein the relative position determination device is a MEMS device.

8. The digital image stabilization system of claim 1, further comprising means for at least one of white balancing, compensating for slight color shifts under different light conditions, auto-exposure compensating, anti-vignetting, auto black level compensating, auto flicker compensating, color correction compensating, saturation level compensating, color space converting, changing data or pixel format, demosaicking, gamma correcting, halftoning, desaturating, changing pixel color gains, pixel mismatch correcting, pixel sharpening, subsampling, median filtering, spatial filtering, frequency-wavenumber processing, color processing, and color adjusting.

9. The image stabilization system of claim 1, wherein the system is incorporated into at least one of a digital still camera and a digital video camera.

10. The image stabilization system of claim 1, further comprising at least one of a user shutter control, a removable memory, a display, a lens controller and a computer-readable storage medium.

11. A digital image stabilization system, comprising:
means for sensing light and storing same as analog voltages in a pixel array, the sensing and storing means further comprising at least first and second rolling shutter means;
means for storing digital data and software code;
means for processing data and executing the software code;
a lens operatively coupled to the light sensing means, and means for sensing relative positions;
wherein the light sensing means, the digital data storage means, the software code, the processing means, the lens and the relative position sensing means are operatively connected to one another and configured to: (a) capture simultaneously exposed at least first and second images of the same subject, at least portions of the first image being captured by the first rolling shutter while at least portions of the second image are being captured by the second rolling shutter; (b) spatially align first and second data sets comprising individual data points based on information sensed and provided by the relative position determination device, where the first and second data sets correspond to pixel arrays containing analog pixel voltages, the pixel arrays forming the first and second images, respectively, and (c) add individual data points from the aligned first and second data sets to form an output data set.

12. The digital image stabilization system of claim 11, wherein the system is configured to capture individually underexposed at least first and second images.

13. The digital image stabilization system of claim 11, wherein the system is configured to capture individually properly exposed at least first and second images.

14. The digital image stabilization system of claim 11, wherein the system further comprises at least one analog sample-and-hold register for receiving, storing and transmitting a series of analog voltages corresponding to pixel analog voltages to an analog-to-digital converter or a buffer.

15. The digital image stabilization system of claim 14, wherein the system further comprises at least one analog-to-digital converter located between an output of the at least one analog sample-and-hold register and an input to the memory.

16. The digital image stabilization system of claim 11, wherein the relative position sensing means is an angular rate sensor.

17. The digital image stabilization system of claim 11, wherein the relative position sensing means is a MEMS device.

18. The digital image stabilization system of claim 11, further comprising means for at least one of white balancing, compensating for slight color shifts under different light conditions, auto-exposure compensating, anti-vignetting, auto black level compensating, auto flicker compensating, color correction compensating, saturation level compensating, color space converting, changing data or pixel format, demosaicking, gamma correcting, halftoning, desaturating, changing pixel color gains, pixel mismatch correcting, pixel sharpening, subsampling, median filtering, spatial filtering, frequency-wavenumber processing, color processing, and color adjusting.

19. The image stabilization system of claim 11, wherein the system is incorporated into at least one of a digital still camera and a digital video camera.

20. The image stabilization system of claim 11, further comprising at least one of a user shutter control, a removable memory, a display, a lens controller and a computer-readable storage medium.

21. A method of stabilizing digital images in an imaging device, comprising using the device to capture simultaneously a plurality of digital images of the same subject and storing same in a memory thereof as individual data sets, sensing the relative position corresponding to the device for each of the captured images and storing data representative of same in the memory, aligning the individual data sets on the basis of calculations performed using the data, and adding data points from each of the aligned set sets to form an output data set representative of an output image.

22. The method of claim 21, wherein each image is one of underexposed and properly exposed.

23. The method of claim 21, further comprising white balancing, compensating for slight color shifts under different light conditions, auto-exposure compensating, anti-vignetting, auto black level compensating, auto flicker compensating, color correction compensating, saturation level compensating, color space converting, changing data or pixel format, demosaicking, gamma correcting, halftoning, desaturating, changing pixel color gains, pixel mismatch correcting, pixel sharpening, subsampling, median filtering, spatial filtering, frequency-wavenumber processing, color processing, and color adjusting at least one of the individual data sets and the output data set.

* * * * *